Aug. 12, 1958  M. L. ADLEY  2,846,703
LOADING DOCK

Filed Sept. 27, 1955  2 Sheets-Sheet 1

INVENTOR.
Michael Louis Adley
BY
Munn, Liddy, Nathanson & March
ATTORNEYS

Aug. 12, 1958 — M. L. ADLEY — 2,846,703
LOADING DOCK
Filed Sept. 27, 1955 — 2 Sheets-Sheet 2
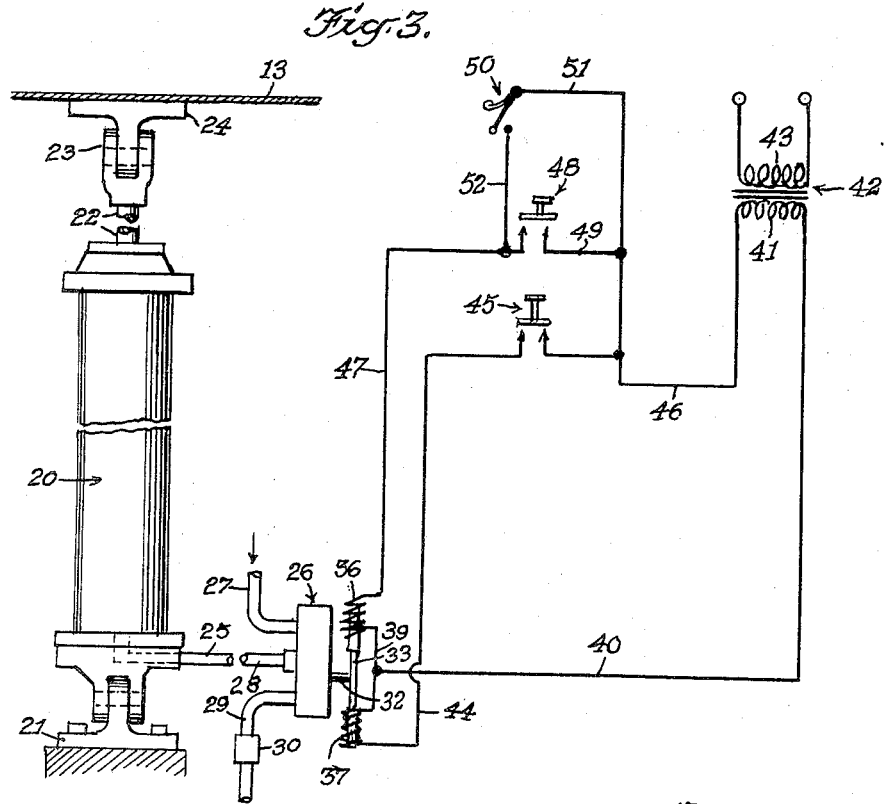
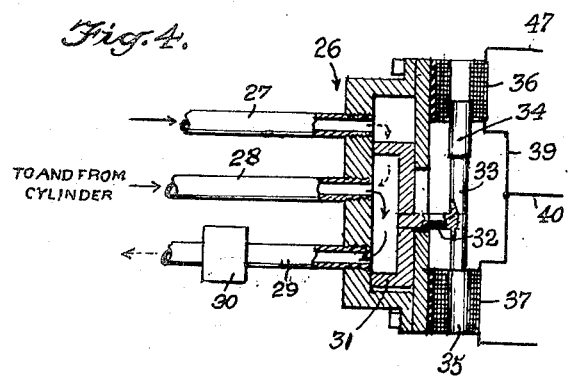
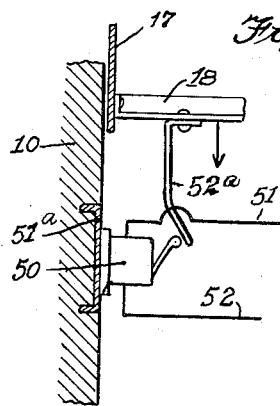
INVENTOR.
Michael Louis Adley
BY
Munn, Liddy, Nathanson & March
ATTORNEYS

United States Patent Office 2,846,703
Patented Aug. 12, 1958

2,846,703

LOADING DOCK

Michael Louis Adley, New Haven, Conn.

Application September 27, 1955, Serial No. 536,882

6 Claims. (Cl. 14—71)

This invention relates to loading docks such as are provided at freight terminals, warehouses and the like for use with trucks and similar vehicles, and more particularly to loading docks which have movable ramp sections or platforms adapted to engage the bodies of the vehicles and to provide runways between the dock and said bodies.

Heretofore various types of loading docks have been proposed, having movable decks or platforms which are raised or lowered by power supplied from hydraulic or pneumatic means. These prior constructions were not completely satisfactory since the movable platform itself was so constructed that, when not in use, it rested near the ground and could be run over or into by the wheels of a truck or struck by the truck body, causing damage. If the platform was partially raised or somewhat level it necessitated judgment of its height and the distance between the rear of the truck and the platform, in order that it could be properly engaged with the vehicle. I have found that where movable platforms extend from the stationary loading platform in a plane parallel to the ground, they are invariably damaged by trucks backing into the same for unloading or loading operations.

An object of the present invention is to provide a novel and improved loading dock with a movable platform, wherein the platform when not being used is so disposed that it can not be inadvertently contacted by the rear of a truck, trailer, or other similar vehicle.

A further object of the present invention is to provide an improved loading dock and movable loading or ramp platform as above set forth, wherein the platform will be automatically raised to inoperative position upon the occurrence of the truck's departure and removal of the support of the platform by the truck.

A still further object of the present invention is to provide an improved loading dock and movable platform which is rugged in construction, reliable and foolproof in its operation, and relatively inexpensive to manufacture.

A feature of the invention resides in the provision of an improved loading dock and automatic platform or ramp, which is simple to operate and requires no skill on the part of the operator.

Another object of the invention is to provide an improved loading dock and automatically movable ramp or platform in accordance with the above, which is so arranged and organized that no acts or operations are required on the part of the operator to effect the moving of the platform to its out-of-the-way or storage position immediately after the departure of the vehicle on which the platform rested.

A still further object of the invention is to provide an improved loading dock and automatically movable platform as above set forth, which will not be damaged or put out of order if it should be improperly operated by the user.

Other features and advantages will hereinafter appear.

In the drawings accompanying this specification, similar characters of reference indicate corresponding parts wherever possible in the several views, in which:

Fig. 3 is a schematic circuit diagram of the power actuator and control therefor, as used with the dock and platform shown in Figs. 1 and 2.

Fig. 4 is a diagrammatic representation of one type of valve control suitable for use in the circuit of Fig. 3.

Fig. 5 is a fragmentary detail showing a limit switch and an actuator for the switch, the latter being carried by the movable platform.

Figure 1:
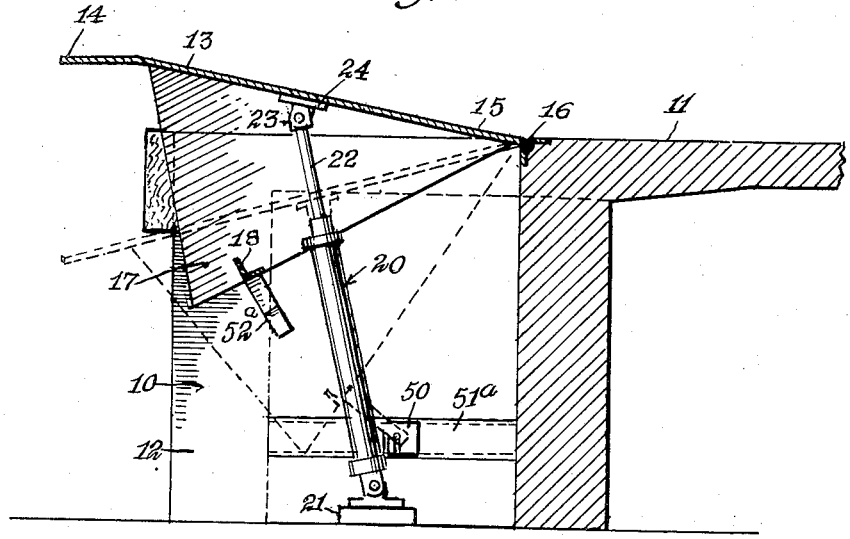
Figure 1 is a transverse vertical sectional view of a loading dock having a movable loading or ramp platform made in accordance with the invention, the platform being shown in its raised or storage position, and other positions of the platform being shown by broken lines.
Figure 2:
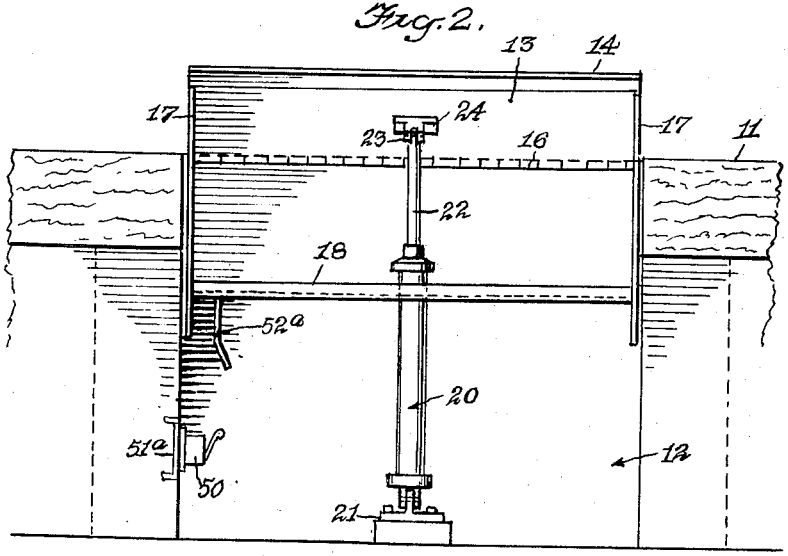
Fig. 2 is a front elevational view of the loading dock and platform of Fig. 1.

Referring to Figs. 1 and 2 there is shown a conventional type of loading dock 10 having an upper surface 11 adapted to handle traffic such as hand trucks and the like. A recess 12 is provided in the dock 10, in which there is pivotally mounted a movable ramp platform 13 having a forward edge portion 14 adapted to engage and rest on the body or tailboard of a commercial vehicle or truck. The ramp 13 has a rear edge portion 15 secured by a stout hinge means 16 to the dock 10 at the upper surface 11 thereof, and by the provision of the hinge means 16 the platform 13 may be pivotally shifted between an uppermost position as shown in full lines in Fig. 1, and a lowermost position as shown in broken lines in said figure. The platform 13 may, of course, occupy various intermediate positions, according to the requirements of the vehicle which is being loaded or unloaded.

A pair of triangular shaped depending skirts 17 is secured to the opposite side edges of the platform 13, the lower portions of said skirts being connected by an angle iron member 18, as shown.

In accordance with the present invention I provide a novel automatic control for the platform 13 by which it is always brought into its uppermost position as shown in Fig. 1 when not in use, such action taking place immediately upon departure of the truck or vehicle on which the platform has been resting.

In accomplishing this, referring to Figs. 3 and 4, I provide a unidirectional-driving power-operative motive means including an air cylinder 20 which is pivotally mounted on a base 21 secured to the floor of the recess 12 in the dock. The cylinder 20 has the usual piston (not shown) connected to a piston rod or plunger 22 having a pivotal fitting 23 by which it is connected to a bracket 24 secured to the underside of the platform 15. The cylinder 20 has a fluid supply line 25 connected to its bottom portion, through which air may enter the cylinder to raise the plunger 22 and bring the platform 13 to its uppermost position. By bleeding air from the line 25 the plunger 22 and platform 13 will of course slowly descend, and if there is no supporting surface such as the body or tailboard of a truck in its path, the platform will attain a lowermost position as indicated by the broken lines in Fig. 1.

By this invention I provide a novel and automatic control device, by which the platform 13 is automatically raised to its uppermost position immediately after it is allowed to descend to the lowermost position. Thus upon completion of use of the platform, wherein during such use it is resting on the truck body or tailboard, and upon departure of the truck, the platform by its own weight may descend to the said lowermost position whereupon it will be automatically raised by the cylinder 20 to the uppermost position and retained in the latter.

The improved control device by which this is effected includes a valve 26, which may be of the type shown diagrammatically in Fig. 4. The valve 26 may comprise an inlet 27 for air, an outlet 28 connected with the inlet 25 of the cylinder, and an air discharge or exhaust pipe 29 connected to a blow-off or limit valve 30. The valve 26 may further comprise a valve member 31 slidable to interconnect either the inlet 27 and outlet 28 or the outlet 28 and exhaust 29. The valve member 31 may have an operating arm 32 connected to a plunger 33 carrying magnetic cores 34 and 35 by which the member may be actuated through electrical solenoids. Associated with the core 34 is a solenoid coil 36, and associated with the core 35 is a solenoid coil 37. It will be understood that energization of the coil 36 will shift the valve member 31 upward, where it will remain after deenergization of the coil. Energization of the coil 37 will shift the valve member 31 downward, where it will also remain after deenergization of said coil. Thus, power may be applied to the piston and cylinder by using the means comprising the valve 31 and solenoids 36 and 37.

In Fig. 3 the coils 36 and 37 are shown as joined by a wire 39 which is in turn connected to a wire 40 supplied from the secondary 41 of a transformer 42 having a primary 43 connected to a source of electrical energy. The coil 37 has a wire 44 connected to a "down" switch 45, which latter is connected by a wire 46 to the secondary coil 41. The coil 36 is connected by a wire 47 to an "up" switch 48 which is connected by a wire 49 to the wire 46.

In parallel with the "up" switch 48 is a momentary-contact limit device or switch 50 connected by wires 51 and 52. As shown in Fig. 5 the limit switch 50 may be advantageously mounted on a cross bar 51a secured to the dock 10 so as to be in the path of travel of the platform 13, and the latter may be provided with an actuator finger 52a adapted to operate the switch 50 when the platform reaches its lowermost position.

Referring again to Figs. 3 and 4, it will be seen that when the operator presses the "down" switch 46 the valve member 31 will attain the down position shown, wherein the cylinder 20 may exhaust through the blow-off valve 30. The platform 13 will thus by its weight move or force downward the piston in the cylinder, and will slowly descend at a speed determined by the valve 30; it may thus be brought to rest upon the body or tailboard of a vehicle backed against the dock 10. If for any reason it is necessary for the operator to raise the platform 13 he may do so by depressing the "up" switch 48. This will shift the valve member 31 upward as viewed in Fig. 4, connecting the cylinder 20 with the air supply 27 and causing the platform to raise. At any time during such raising movement the operator may halt the platform and cause it to descend again by actuating the "down" switch 45.

After the platform 13 has served its purpose as a ramp between the truck and the dock 10, and when the truck is driven off, the weight of the platform will cause it to descend by gravity to its lowermost position moving or forcing downward the piston in the cylinder 20 without attention on the part of the operator. Upon attaining the said lowermost position, the limit switch 50 will be actuated, causing the valve member 31 to be again shifted upward, whereupon air will enter the cylinder 20 and completely raise the platform 13, maintaining the latter in its raised position in readiness for the next loading operation.

It will be readily understood that by the above structure I have provided an advantageous, novel and improved automatic loading ramp or platform which will require the least possible attention on the part of the operators and truckmen. The automatic ramp will normally be safeguarded against damage due to trucks backing into it, since it will always be automatically returned to raised position as shown in Fig. 1 where it is out of the way.

The power and control means which I have provided are reliable and require little servicing throughout an extended period of use; they are moreover relatively simple, having few components of standard construction, and are economical to fabricate and manufacture.

While the invention has been described in some detail, it will be understood that variations and modifications may be made without departing from the spirit of the invention or the scope of the appended claims.

I claim:

1. In a loading dock construction, a stationary main platform having a recess; a ramp platform movably mounted in the recess of the main platform and movable between positions located below and above the main platform, said ramp platform having an edge portion adapted to rest on the body of a vehicle and be supported thereby; power means for raising said movable platform; means operable when the movable platform reaches a lowermost position below the level of the main platform, for automatically activating said power means to lift the platform to a raised position wherein the edge portion thereof is normally disposed above the level of the vehicle body, said power means comprising a fluid cylinder, a valve for controlling the supply of fluid to the cylinder, an electrical actuator for the valve, and an electrical switch for controlling said actuator; means including a second electrical actuator for the valve and a second switch for controlling said second actuator, providing for controlled discharge of fluid from the cylinder to enable the ramp platform to descend to said lowermost position, the said means which is operable when the platform reaches said lowermost position including a limit switch connected in parallel with said first-mentioned switch, for controlling the first-mentioned electrical actuator.

2. The invention as defined in claim 1 in which the limit switch is disposed on a side of the recess of the main platform, and in which the ramp platform has a projection extending downward and adapted to engage and actuate the limit switch.

3. In a loading dock construction, a stationary main platform having a recess; a ramp platform movably mounted in the recess of the main platform and movable between positions located below and above the main platform, said ramp platform having an edge portion adapted to rest on the body of a vehicle and be supported thereby; power means for raising said movable platform; means operable when the movable platform reaches a lowermost position below the level of the main platform, for automatically activating said power means to lift the platform to a raised position wherein the edge portion thereof is normally disposed above the level of the vehicle body, said power means comprising a fluid cylinder, a valve for controlling the supply of fluid to the cylinder, an electrical actuator for the valve, and an electrical switch for controlling said actuator; means including a second electrical actuator for the valve and a second switch for controlling said second actuator, providing for controlled discharge of fluid from the cylinder to enable the ramp platform to descend to said lowermost position, said means for discharging fluid including a discharge pipe and a blow-off valve connected therewith, to control the speed of discharge of fluid and thereby the speed of movement of the ramp platform.

4. In a loading dock construction, a stationary main platform having a recess; a ramp platform having appreciable weight, movably mounted in the recess of the main platform and movable between positions located below and above the main platform, said ramp platform being adapted to descend under its own weight and having an edge portion adapted to engage the body of a vehicle and be supported thereby; unidirectional-driving power-operated motive means including a reversibly freely movable member for raising said movable platform when the member moves in one direction, said platform when unsupported by the vehicle descending under its own weight to a lowermost position and moving said member in an opposite direction when said means is devoid of power; means including a limit device operated by the platform when the latter reaches said lowermost position, for applying power to said motive means to cause the movable member thereof to lift the platform to a raised position wherein the edge portion thereof is normally disposed above the level of the vehicle body.

5. The invention as defined in claim 4, in which the power-operated motive means comprises a fluid cylinder, in which the means for applying power includes a valve device for controlling the supply of fluid to the cylinder and an electrical actuator for the valve device, in which the limit device comprises an electrical switch for controlling said actuator, and in which there is means including a second electrical actuator for the valve device and a second switch for controlling said second actuator, providing for discharge of fluid from the cylinder to make possible free movement of the said freely movable member of the motive means in said opposite direction to enable the ramp platform to move said member downward when descending to said lowermost position.

6. The invention as defined in claim 4, in which the said limit device comprises an electric limit switch, and in which there is a manually operable electric switch connected in parallel with the said limit switch.

References Cited in the file of this patent

UNITED STATES PATENTS

| | | |
|---|---|---|
| 1,927,583 | Ernst | Sept. 19, 1933 |
| 2,132,325 | Soldatti | Oct. 4, 1938 |
| 2,547,460 | Hamilton | Apr. 3, 1951 |
| 2,639,450 | Ramer | May 26, 1953 |
| 2,644,971 | Rowe | July 14, 1953 |
| 2,746,251 | Ashton | May 22, 1956 |